United States Patent [19]

Holst et al.

[11] Patent Number: 4,925,254
[45] Date of Patent: May 15, 1990

[54] ANTI-LOCK BRAKE SYSTEM FOR VEHICLES

[75] Inventors: Hans Holst; Klaus Lindemann, both of Hanover; Manfred Saba, Ronnenberg; Hans-Harald Kaess, Isernhagen; Erwin Petersen, Wunstorf, all of Fed. Rep. of Germany

[73] Assignee: WABCO Westinghouse Fahrzeugbremsen GmbH, Hanover, Fed. Rep. of Germany

[21] Appl. No.: 242,027

[22] Filed: Sep. 8, 1988

[30] Foreign Application Priority Data

Sep. 21, 1987 [DE] Fed. Rep. of Germany ....... 3731685
Oct. 7, 1987 [DE] Fed. Rep. of Germany ....... 3733801

[51] Int. Cl.$^5$ .......................... B60T 8/64; B60T 8/60
[52] U.S. Cl. .................................... 303/111; 303/103; 303/100; 364/426.02
[58] Field of Search .................... 303/95, 96, 97, 100, 303/103, 105, 106, 110, 111; 188/181 A, 181 C; 364/426.02

[56] References Cited

U.S. PATENT DOCUMENTS

| | | | |
|---|---|---|---|
| 3,794,389 | 2/1974 | Davis et al. | 303/106 |
| 3,909,070 | 9/1975 | Leiber | 188/181 C X |
| 3,980,346 | 9/1976 | Leiber | 188/181 A X |
| 3,980,350 | 9/1976 | Öberg | 303/106 |
| 4,005,910 | 2/1977 | Leiber et al. | 303/96 |
| 4,239,295 | 12/1980 | Rode | 303/106 |
| 4,313,166 | 1/1982 | Rode et al. | 303/105 |
| 4,637,663 | 1/1987 | Matsuda | 364/426.02 X |

OTHER PUBLICATIONS

"SAE Technical Paper Series #861961", Petersen et al., WABCO Westinghouse, 11/1986.
Leiber, Electronic Control Unit for Passenger Car Antiskid, 29th IEEE Vehicular Technology Conference; 3-1979.

Primary Examiner—Andres Kashnikow
Assistant Examiner—Timothy Newholm
Attorney, Agent, or Firm—Horst M. Kasper

[57] ABSTRACT

An anti-lock brake system for vehicles with an electronic system which regulates the braking pressure of a monitored wheel as a function of the wheel speed, so that locking is prevented. The system is designed so that each wheel has its own speed sensor, and both wheels of one axle are pressurized with pressure medium by means of a joint control valve controlled by the electronic system. This arrangement corresponds to that of a select-low regulation. To shorten the extended braking distance on roads with different traction on each side, which occurs with a select-low regulation, the control system is designed so that when a retard signal (−b) occurs, the electronic system does not switch as usual to "remove pressure", but, at least until the occurrence of a slip signal (λ), the control valve is switched to the "maintain pressure" position.

23 Claims, 7 Drawing Sheets

ANTI-LOCK BRAKE SYSTEM FOR VEHICLES

FIELD OF THE INVENTION

The present invention relates, in general, to vehicle brake systems and, more particularly, this invention relates to an anti-locking brake circuit for such vehicle brake system.

BACKGROUND OF THE INVENTION

Prior to the present invention, various control concepts are known and are in use for anti-locking brake systems which are arranged in series. Included in the prior art are various regulation concepts for anti-lock brake systems that are in mass production.

For example, the single wheel or individual control and regulation (IC) anti-lock brake system envisions each wheel on the vehicle having a separate control circuit including its own sensor and setup unit or actuator. Such setup unit or actuator is a solenoid valve. This system provides optimum control or regulation of the brake system, but at a significant expense.

A modified individual control and regulation (MIC) anti-lock brake system is taught in German Patent DE-OS 28 51 107. As taught therein, this (MIC) anti-lock brake system provides improved control of the steering effort on roadways having variable or different force requirements on a roadway in which traction conditions change and differ from one side to the other. This improved steering control is accomplished by reducing the side drift or yawing moment of the vehicle during normal driving. For the so-called "high wheel", which is the wheel operating on the good side of the road, it has, for example, a pressure-holding or maintenance phase which is ensured if and when the so-called "low wheel" is operating on a bad side of the road and this (MIC) anti-lock brake system receives a pressure drop indication as a consequence of a deceleration and/or a wheel skid or slip signal.

In addition to individual control and regulation, it is also known in the prior art to utilize anti-lock brake regulation systems for an axle or a group of wheels. All such prior art systems can be used on a vehicle, regardless of whether the brake system is pneumatically operated or hydraulically operated. In the regulation system for an axle or group of wheels, one sensor is used for each wheel but, for cost consideration, a common setting or actuator unit is used for both wheels on an axle. For this reason, the brake cylinders of both wheels are connected in a parallel manner.

In a so-called select low control or regulation anti-lock brake system (SLC), that is frequently used on vehicles, the common brake pressure on both wheels is reduced and, thereafter, further regulated and controlled as a function of the movement of a particular wheel having the lower traction or lower power application (low wheel). In any event, a pressure reduction takes place in each prior art device as soon as a delay signal ($-b$) and/or a slip signal ($\lambda$) is generated by the sensor associated with the low wheel. In such SLC anti-lock brake systems, certain low control settings will lead to a relatively high excess commencing force. In addition, this can, on occasion, lead to a significant amount of under-braking of the high wheel operating on a good side of the road. This then is a contributing factor to substantially extended braking distances encountered at times as compared with the (IC) anti-lock brake system, or even when braking with locked wheels. Such extended braking distances occur most frequently on so-called $\mu$-split roadways, as well as on roadways with changing values for the coefficient of friction (such as icy conditions, etc.) or on uneven surfaces (such as cobblestone pavement, potholes, or generally poor roads) and with wheel brakes having different ratings.

In some cases, therefore, a so-called select high control or regulation (SHC) anti-lock brake system is used. Such SHC anti-lock brake system does not take into consideration the motional reaction in movement of the low wheel but, instead, reacts only to the retarding and/or slip signals generated from the sensor associated with the high wheel. Of course, the unavoidable result is a locking of the low wheel, even for rather long periods of time. Such a lockup of the low wheel (even if for an extended period of time) is, however, included with deliberate intent. Nevertheless, such (SHC) anti-lock brake system can lead to an undesirable flat tire condition at the low wheel, and to reduced conditions of vehicle stability when braking occurs on a curve on roadways having excellent traction conditions.

As far as such (SLC) or (SHC) anti-lock brake systems are used in commercial or utility vehicles, the pressure control and regulation in most cases is generally carried out by the use of a 3/2 way multi-directional solenoid valve. Such 3/2 way multi-directional solenoid valve has only a pressurization and evacuation phase, and not a pressure maintenance or holding phase.

SUMMARY OF THE INVENTION

The present invention provides an anti-lock brake system for a vehicle. Such anti-lock brake system includes an electronic control system which, as a function of the wheel speed, forms internal signals for the wheel slip ($\lambda$), the wheel acceleration ($+b$), and/or the wheel retardation ($-b$). The wheel rotational speed is determined by a speed sensor associated with two wheels on one axle or on one side of the vehicle. The internal signals generated in the electronic control system are transmitted to a common control valve for controlling the brake pressure in selected brake cylinders. Such signals transmitted to such control valve are one of reduce, maintain constant, or increase brake pressure as necessary. Such electronic control system with the receipt of signal from the speed sensor associated with a low-wheel and determined by such electronic control system to be a retarding signal ($-b$) will switch the control valve to a maintain pressure mode. The electronic control system with the receipt of a signal from the speed sensor associated with such low wheel and determined by such electronic control system to be a slip signal ($\lambda$) will switch the control signal valve to a reduce-pressure mode, and when the electronic control system determines when the slip signal ($\lambda$) disappears then it will transmit a control signal which switches the control valve to an increase-pressure mode.

OBJECTS OF THE INVENTION

It is, therefore one of the primary objects of the present invention is to provide a vehicle anti-lock braking system in which brake cylinder control is arranged in pairs, and in which a braking action is improved over prior art (SLC) anti-lock brake systems.

Another object of the present invention is to provide a vehicle anti-lock braking system in which wheel lockup, which occurs in prior art (SHC) anti-lock brake systems, is minimized or eliminated completely as far as possible.

In addition to the above objects and advantages of the anti-lock brake system of the present invention, various other objects and advantages of such invention will become more readily apparent to those persons skilled in the vehicle braking art from the following more detailed description of the invention, when such description is taken in conjunction with the attached drawings and with the appended claims.

BRIEF DESCRIPTION OF THE INVENTION

Figure 1:
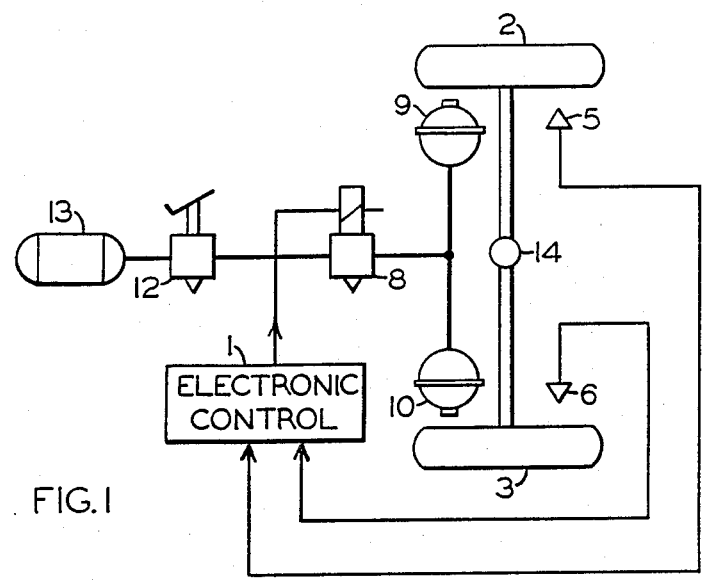
FIG. 1 is a schematic illustration of an anti-lock brake system having brake cylinder control and regulation by axles.

Prior to proceeding to a more detailed description of the invention, it should be noted that identical components have been identified with identical reference numerals throughout the drawing Figures.

Now refer more particularly to FIG. 1 in which an axle 14 of a vehicle is illustrated. The axle 14 is illustrated as a driven axle, but it could also be an axle of a trailer, for example. Connected to each end of the axle 14 is a wheel designated 2 and 3. Each wheel 2 and 3 on this axle 14 has its own speed sensor designated 5 and 6, respectively. Such speed sensors 5 and 6 can be revolution counters. Further, these speed sensors 5 and 6 generate signal values that are representative of the rotation and/or rotational behavior of the associated wheel. The signal values from the speed sensors 5 and 6 are conducted as an input signal to an electronic control system 1. The processing of these input signals in the electronic system 1 will be explained in more detail hereinafter.

Each of the two wheels 2 and 3 are equipped with a corresponding brake cylinder 9 and 10, respectively. The brake cylinders 9 and 10 are pressurized by a common control valve 8 and depressurized by evacuation of such common control valve 8. The control valve 8 is a solenoid-operated valve and is assembled as a three position valve. In addition to an increase-pressure position and a decrease-pressure position, the control valve 8 includes a pressure-holding or maintenance position. The activation or control coil of the control valve 8 is connected to an output terminal of the electronic control system 1 and is controlled into one of these three positions based on the output control signal from such electronic control system 1.

Although the anti-lock brake system illustrated in FIG. 1 is a pneumatic brake system supplied by a compressed air system 13 it could also be a hydraulic brake system. The compressed air system 13 is shown as an air reservoir which would be supplied by a source of compressed air (not shown). The desired brake pressure is set by the driver, of the vehicle, activating the brake valve 12. Such brake valve 12 is illustrated as a foot-pedal-operated brake valve, but it could be an electrically controlled brake valve as well.

The anti-lock brake system illustrated in FIG. 1 is generally similar in design to the (SLC) anti-lock brake system of the prior art or, depending on the control applied, it may be generally similar to a (SHC) anti-lock brake system.

Figure 2:
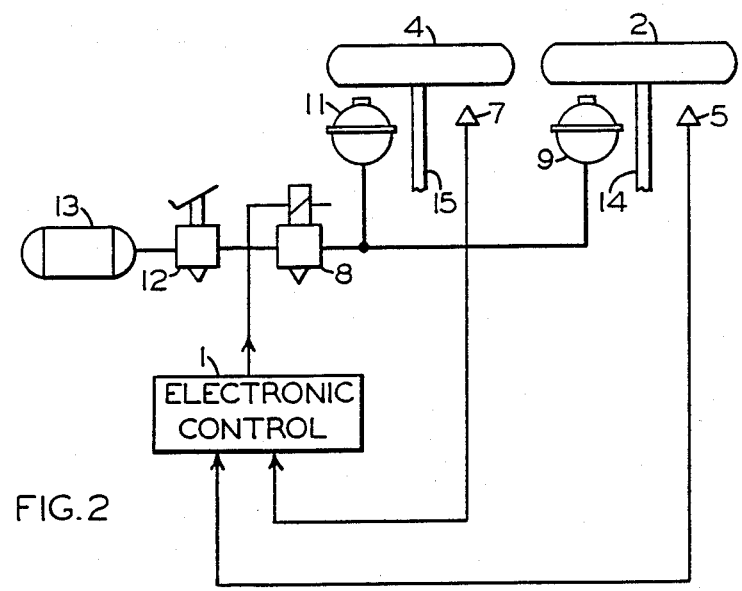
FIG. 2 is a schematic illustration of an anti-lock brake system having lateral brake cylinder control and regulation.
Figure 3:
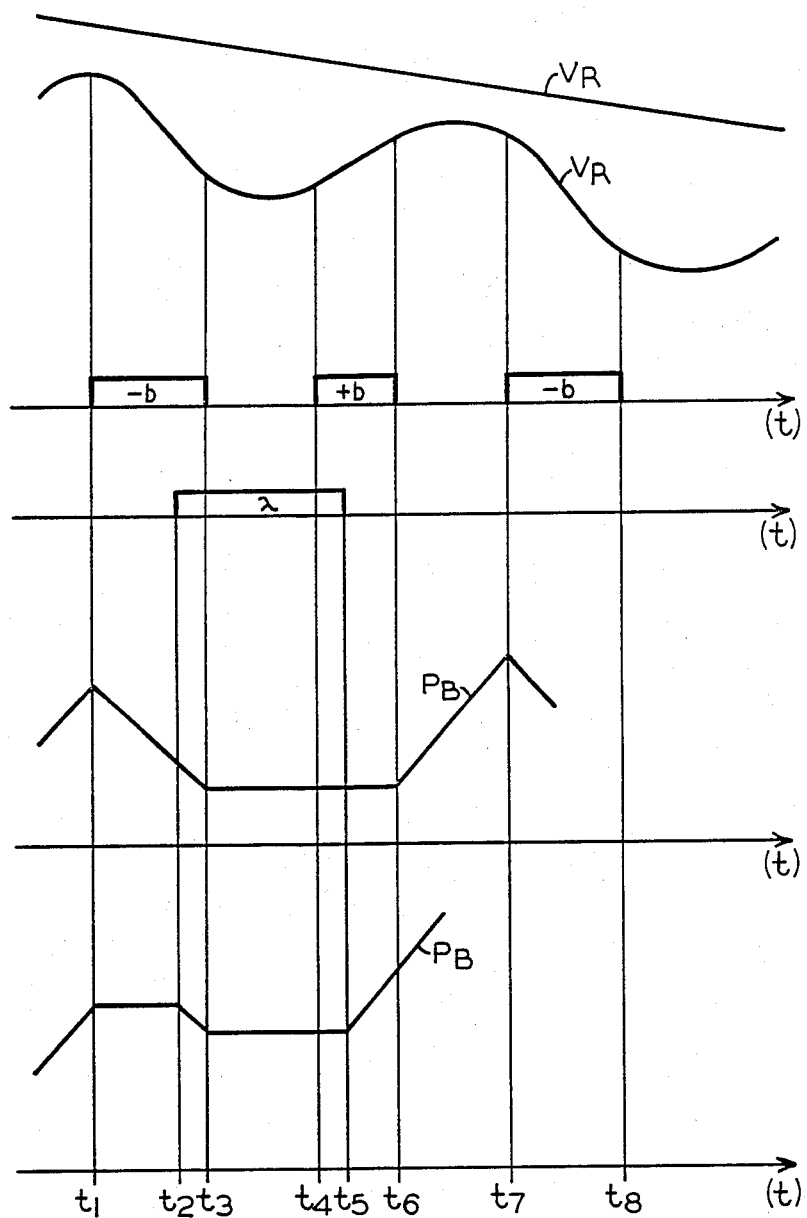
FIG. 3 is a graphic illustration of a pressure circuit as it is being achieved by the invention.

Now refer more particularly to FIG. 2. The anti-lock brake system illustrated in FIG. 2 is essentially identical to that of FIG. 1. In this case, however, the wheel brake control is not by axle, but instead, the wheel brake control is by vehicle sides or by lateral control of the wheels 2 and 4. The wheel 4 of the second axle, therefore, is equipped with a speed sensor 7 and a brake cylinder 11. The two brake cylinders 9 and 11 for the wheel 2 and 4, respectively, are switched in parallel by the common solenoid control valve 8. Otherwise, the schematic illustration of the anti-lock brake system in FIG. 2 is the same as in FIG. 1. For a better understanding of the present invention, reference is now made to FIG. 3. FIG. 3 graphically illustrates the wheel velocities, the acceleration, the deceleration, and the slip signals which are generated in the electronic control system 1. These signals are shown together with a plot of the brake pressure system curve according to the state of the art, and a plot of the brake pressure system curve according to this invention with respect to time.

As the basis of the schematic illustration in FIG. 3, the operational function of the anti-lock brake system, according to this invention, as used in a vehicle application, will now be explained in greater detail.

For the purposes of the following discussion, it is assumed that the vehicle is in a controlled braking condition. In this case, the low wheel which is operating on the bad side of the roadway, shows the typical velocity wave shape speed curve $v_{RLow}$. On the other hand, the high wheel which is operating on the good road side, operates without need for control, i.e., its velocity $v_{RHigh}$ corresponds by and large to the velocity of the vehicle.

As a consequence of changes in the velocity of the low wheel, the electronic control system 1 will produce appropriate control signals for deceleration ($-b$), acceleration ($+b$), and for slippage ($\lambda$) of the controlled wheel. The method by which such control signals are produced in the electronic control system 1 is known in the art. The slippage signal ($\lambda$) generally means, that the velocity of the controlled wheel has fallen below the reference velocity of the vehicle by a certain predetermined percentile.

The customary and standard pressure flow for a control circuit according to the state of the art (brake pressure $P_B$), as evidenced by a conventional pressure curve, starts at a point in time $t_1$ with a decrease in pressure for the duration of the occurence of the deceleration ($-b$) signal in the system. The pressure is then maintained or held steady for the duration of the slippage signal ($\lambda$) to the termination of the acceleration signal (+b). Subsequently, a repressurizing will occur, until a new deceleration signal (−b) will appear. Such repressurizing may be pulsed.

According to the present invention, however, no pressure drop will occur with the appearance of the deceleration signal (−b) at time $t_1$, except for a pressure holding. A pressure decrease at time $t_2$ will occur only when the slippage signal (λ) is given.

Alternatively, a brake pressure decrease can also occur when the second wheel (high wheel) generates a deceleration signal (−b) and/or a slip signal (not shown).

Once such a brake pressure reduction does occur, the drop will last up to the renewed drop of the deceleration signal (−b). At a point in time (time $t_3$), possible also in pulsated form, the brake pressure, at a holding phase at low pressure, will relatively soon, i.e., after disappearance of the slip signal (λ), intensify or increase in pulsation at a point in time (time $t_5$), as long as the high wheel has not surpassed its own predetermined slip signal (λ) threshold, or has surpassed it only very briefly. Otherwise, the braking pressure will increase only in the customary way, as is shown in the prior art, after an increased acceleration (+b-decrease) of both wheels.

It is important to note that with the invention generated anti-lock brake system control concept, a deliberately higher slip at the low wheel is tolerated on roadways with heavy differential power relationships on the left/right (μ-split) or in spots with very low power application (ice spots, sandy or snowy spots), in favor of maintaining a relatively high braking force for the high wheel. This applies to the axle specific anti-lock brake system control, according to FIG. 1, as well as to the lateral anti-lock brake system control, according to FIG. 2.

As can be seen in FIG. 3, the tolerated level of the braking pressure is at times higher for the invention concept, than for the state of the art. With the invention, the traditional concept of anti-locking brake systems will be deliberately disregarded, whereby the controlled wheel is not permitted to exceed a maximum (and thus optimal) slip of approximately 20%.

As long as the high wheel itself does not cause the electronic control system 1 to generate control signals with respect to such high wheel, it will brake with the excess of lateral guide force incurred during the pressure holding or maintenance phase from time $t_1$ to $t_2$.

This makes it possible to do without the limited lateral control of the low wheel, which has an already poor power application on poor roadways having low traction, for example. An extended blocking of the low wheel, as it occurs during select high control, will thereby be avoided. For the braking force of the low wheel, because of the respective (μ-λ) characteristics of roadways with low traction (snow, ice, sand), it is of little significance whether the low wheel brakes with a low or a high slippage. It is more important to avoid unnecessary reductions of the braking force. (e.g. as a consequence of ice patches, or wheel vibrations) at the stably braked high wheel which may be operating on a better road surface.

The control concept of this invention will also take the μ-split into consideration. When the high wheel also causes the electronic control system 1 to generate control signals, especially when both wheels are subject to a continuous slip signal (λ) at, for example 100 ms, the electronic control system 1 will switch to a select low control method. This will utilize the lateral guide capability at both wheels of the axle with about equally low power requirements. On the other hand, roadways with high traction forces lead to an avoidance of heavy wheel slippage, and thus high tire wear.

In conjunction with relatively slow reacting solenoid control valves 8, it can be advantageous to use the control cycle of the low wheel as a base first control cycle and to use the subsequent control operations for the above-described concept according to the invention.

It can also be advantageous for low vehicle velocities, such as for $V_F<15$ km/hr., to utilize select low control criteria, in order to lower the bottom control limit or to reduce the subsequently higher slippage. The anti-lock brake system, according to the present invention, has been tested as a new trailer anti-lock brake system. In these tests, the theory behind the above described improvements over the (SLC) and (SHC) anti-lock brake systems has been demonstrated as accurate.

Figure 4:
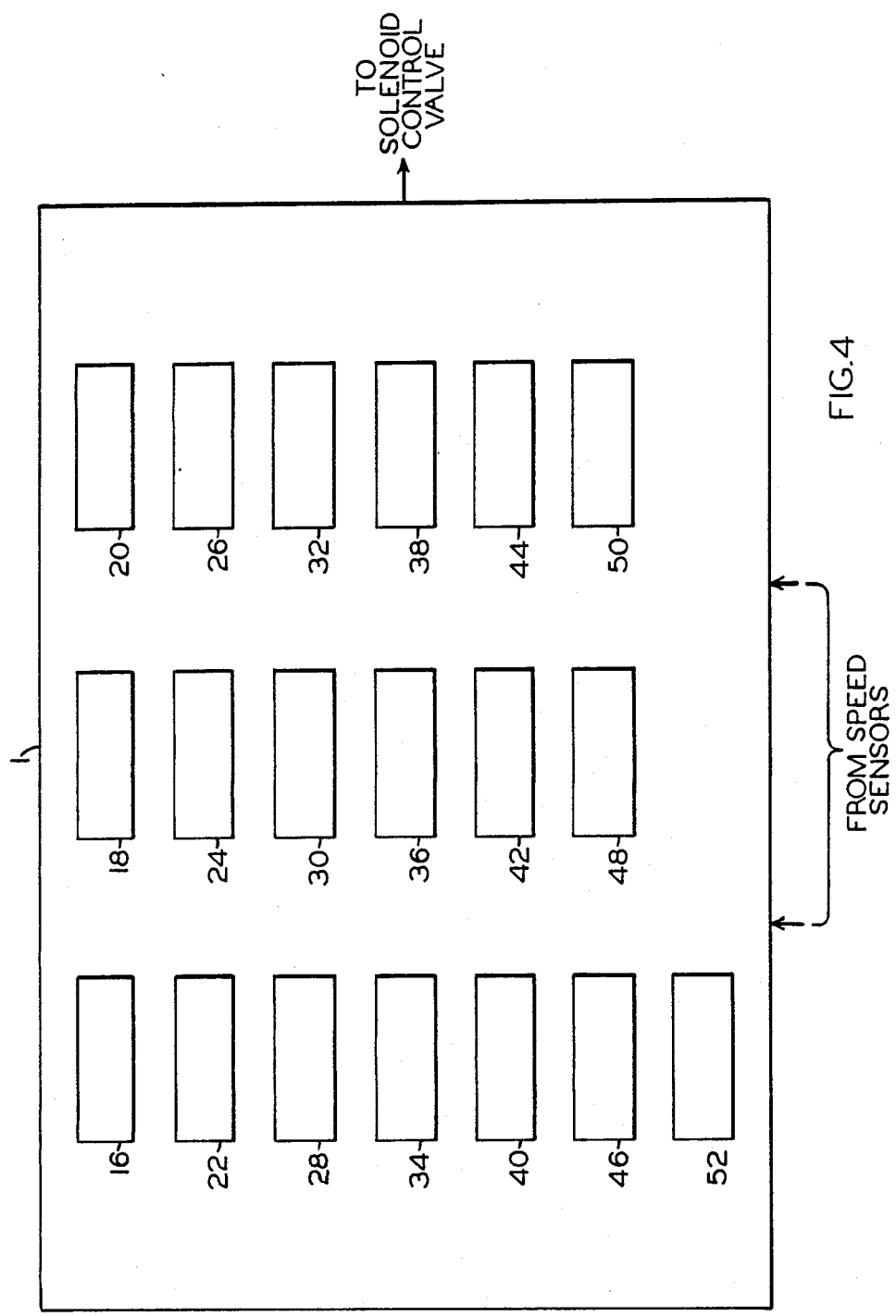
FIG. 4 is an enlarged schematic illustration of the electronic control system illustrated in FIGS. 1 and 2 having various signal processing means incorporated therein.
Figure 5:
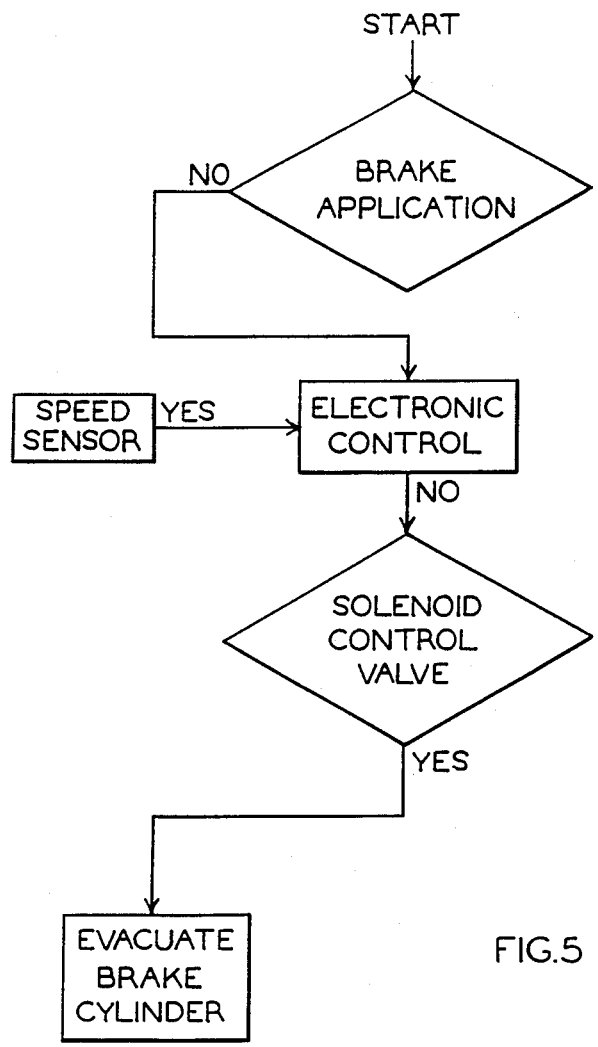
FIG. 5 is a flow chart which illustrates one operation of a presently preferred basic embodiment of a control system for a vehicle anti-lock brake system.
Figure 6:
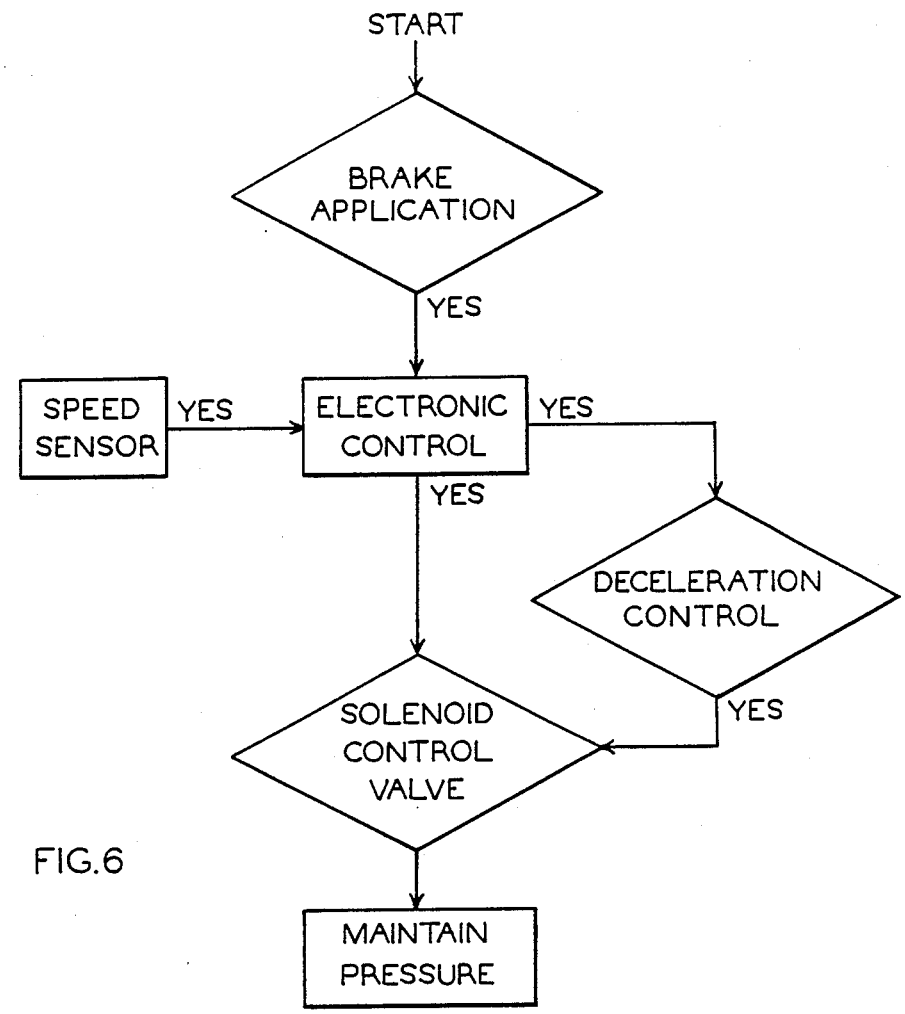
FIG. 6 is a flow chart which illustrates another operation of a presently preferred basic embodiment of a control system for a vehicle anti-lock brake system.
Figure 7:
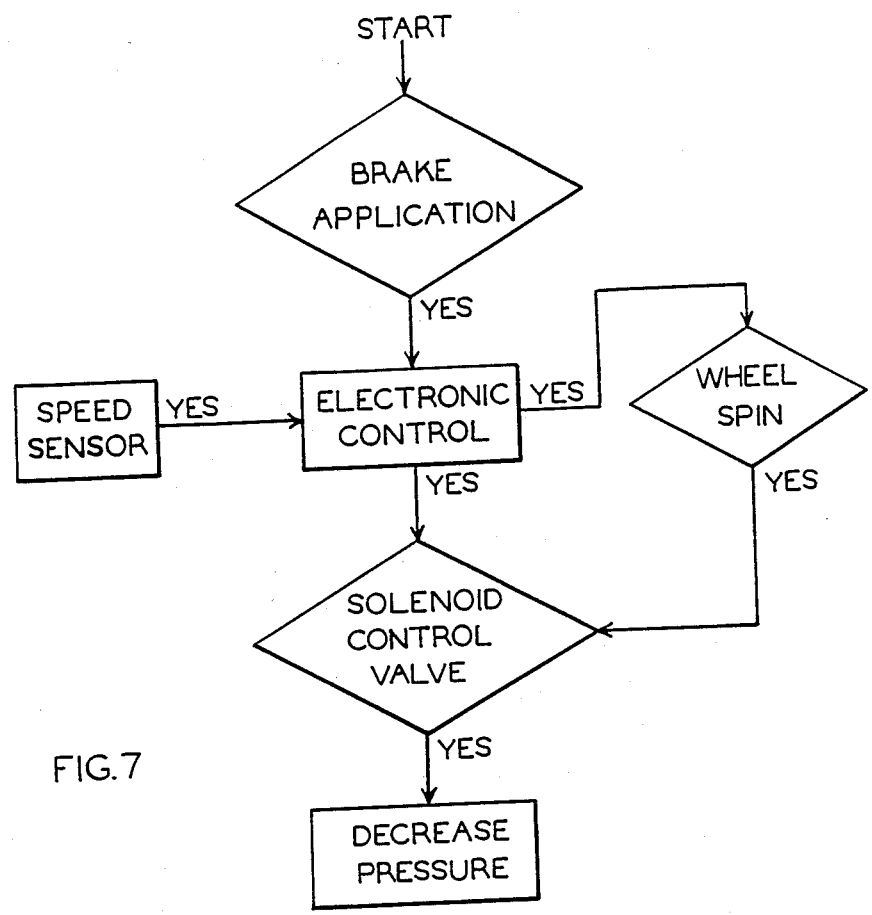
FIG. 7 is a flow chart which illustrates another operation of a presently preferred basic embodiment of a control system for a vehicle anti-lock brake system.
Figure 8:
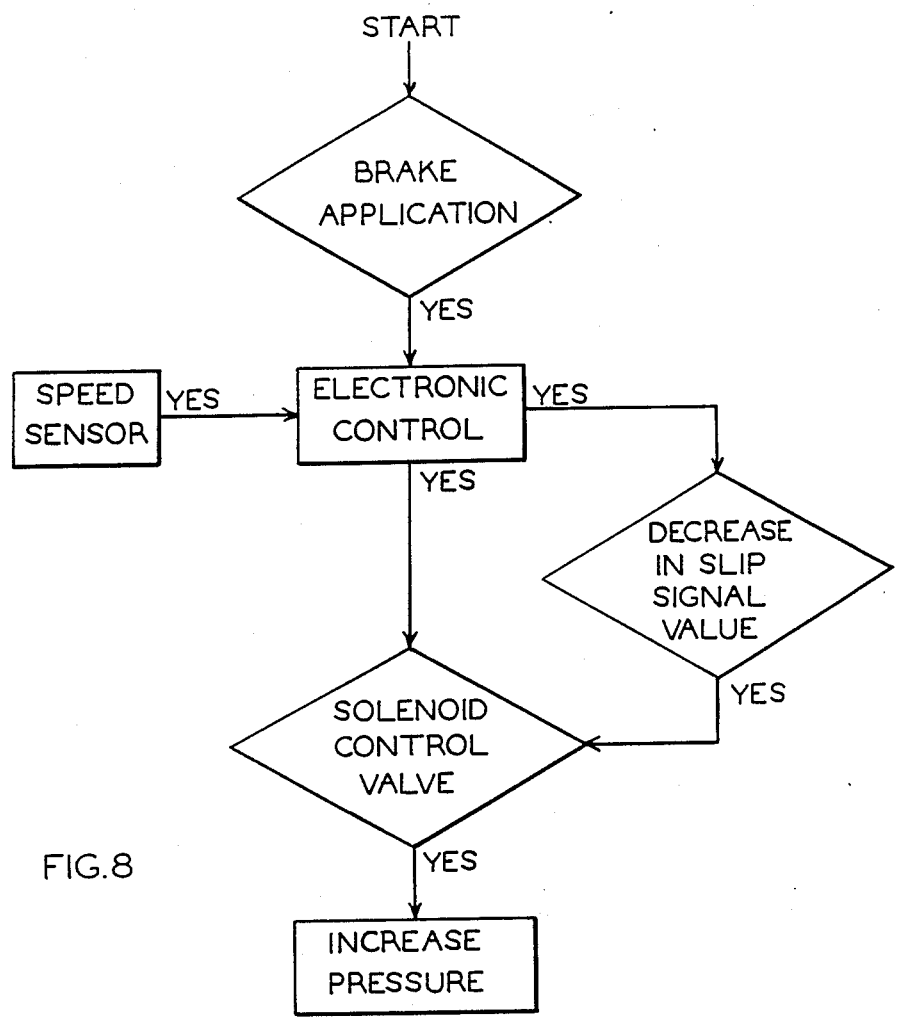
FIG. 8 is a flow chart which illustrates another operation of a presently preferred basic embodiment of a control system for a vehicle anti-lock brake system.

Now refer more particularly to FIG. 4 in which the electronic control system 1 is illustrated schematically. Such electronic control system 1 is positioned on the vehicle in a convenient manner. The electronic control system 1 is electrically connected at the input terminals thereof to receive electrical signal values from the speed sensors 5 and 6 (FIG. 1) and/or 5 and 7 (FIG. 2). Additionally, at the output terminals thereof, such electronic control system 1 is electrically connected to the input terminal of the common electrically actuated and controllable solenoid control valve 8 (FIGS. 1 and 2) to enable feeding electrical control signals generated in such electronic control system 1 to such electrically actuated and controllable solenoid control valve 8.

In the electronic control system 1, there is provided a means 16 for determining when the electrical signal value being fed to such input terminal of the electronic control system 1 is representative of a deceleration (−b) signal value of a low wheel. A means 18 is provided in such electronic control system 1 for generating a brake pressure hold electrical control system 1 in response to a determination in means 16 of such electrical signal value fed to the input terminals thereof being representative of such deceleration (−b) signal value of the low wheel. In addition, a means 20 is provided in the electronic control system 1 for feeding such brake pressure hold electrical control signal to the input terminal of the electrically actuated and controllable solenoid control valve 8. In response to such brake pressure hold electrical control signal being fed to the input terminal of the electrically actuated and controllable solenoid control valve 8 a first predetermined brake pressure on each of a respective brakeable wheel 2 and 3 (FIG. 1) and 2 and 4 (FIG. 2) is maintained. Such first predetermined brake pressure being the initial brake pressure applied at the start of a brake application.

In the presently preferred embodiment of the invention, the electronic control system 1 further includes a means 22 positioned therein for determining when the electrical signal value being fed to the input terminal thereof is an electrical signal value representative of a slip signal value (λ) of such low wheel. In connection with the means 22, there is a means 24 provided in such electronic control system 1 for generating a brake pressure decrease electrical control signal in response to a determination by means 22 of such electrical signal value being fed to the input terminal of such electronic control system 1 being representative of a slip signal (λ)

value of such low wheel. Further, the electronic control system 1 includes a means 26 positioned therein for feeding the electrical control signal generated by means 24 from the output terminal of such electronic control system 1 to the input terminal of such electrically actuated and controllable solenoid control valve 8. Upon receipt of such brake pressure decrease electrical control signal at the input terminal thereof, such electrically actuated and controllable solenoid control valve 8 evacuates a predetermined portion of such first predetermined volume of the fluid pressure medium from the pair of brake cylinders associated therewith thereby decreasing the brake pressure being applied.

A means 28 is provided in such electronic control system 1 for determining when the electrical signal value fed to the input terminal thereof by such speed sensing means 5 and 6 or 5 and 7 is an electrical signal value that is representative of a decrease in the slip signal (λ) value of such low wheel determined in means 22. Within the electronic control system 1 there is a means 30 provided for generating a brake pressure increase electrical control signal in response to a determination in means 28 of such electrical signal value being fed to the input terminal of such electronic control system 1 being representative of such decrease in the slip signal (λ) value of the low wheel. This brake pressure increase electrical control signal is fed from the output terminal of the electronic control system 1 to the input terminal of such electrically actuated and controllable solenoid control value 8 by a means 32 provided in such electronic control system 1. Upon receipt of this brake pressure increase electrical control signal at the input terminal thereof, such electrically actuated and controllable solenoid control valve 8 communicates a second predetermined volume of such fluid pressure medium from an outlet port thereof to each of such predetermined pair of brake cylinders thereby applying a second predetermined brake pressure on each of the respective brakeable wheels.

As presently preferred, the electronic control system 1 includes a means 34 positioned therein for determining when an electrical signal value being fed to the input terminal thereof is an electrical signal value representative of at least one of a deceleration signal (−b) value and a slip signal (λ) value of a high wheel. In response to a determination in means 34 of such electrical signal value being fed to the input terminal of the electronic control system 1 is representative of either a deceleration signal (−b) value on a slip signal (λ) value of such high wheel a brake pressure decrease electrical control signal is generated in a means 36 disposed within such electronic control system 1. A means 38 for feeding the brake pressure decrease electrical control signal generated in means 36 from the output terminal of such electronic control system 1 to the input terminal of such electrically actuated and controllable solenoid control valve 8 is also disposed within such electronic control system 1. When such brake pressure decrease electrical control signal is fed by means 38 to the input terminal of such electrically actuated and controllable solenoid control valve 8, then such electrically actuated and controllable solenoid control valve 8 will evacuate from the predetermined pair of brake cylinders associated with such high wheel a predetermined portion of such first predetermined volumes of the fluid pressure medium thereby decreasing such first predetermined brake pressure being applied thereto.

In a presently preferred embodiment of the invention, when it is determined in the electronic control system 1 by the means 34 that the electrical signal value being fed to the input terminal of such electronic control system 1 is representative of the slip signal (λ) value of the high wheel, then a select low control mode electrical control signal is generated by a means 40 which is also contained within such electronic control system 1. The select low control mode electrical control signal generated by means 40 is fed from the output terminal to such electronic control system 1 to the input terminal of the electrically actuated and controllable solenoid control valve 8 by a means 42 disposed within such electronic control system 1. This results in the anti-lock brake system switching to such select low control mode.

A timing means 44 is provided in the electronic control system 1. Such timing means 44 determines a time duration of the electrical signal value which is representative of such slip signal (λ) value of each of a high wheel and a low wheel being fed to the input terminal of such electronic control system 1. In response to a determination by the timing means 44 of such slip signal (λ) value being present for a time duration of about 100 ms, a select low control mode electrical control signal is generated in a means 46 disposed in the electronic control system 1. This select low control mode electrical control signal generated by means 46 is fed from the output terminal of such electronic control system 1 to the input terminal of the electrically actuated and controllable solenoid control valve 8 by a means 48 disposed in such electronic control system 1. In this manner, the anti-lock brake system is switched to such select low control mode.

According to the present invention, a means 50 is positioned in the electronic control system 1 for switching the electronic control system 1 into a select low control mode during the first control cycle of the anti-lock brake system.

In addition, there is a means 52 positioned within such electronic control system 1 for switching such anti-lock brake system into such select low control mode at a vehicle speed of less then about 15 km/hr.

The basic concept consists of the fact that as compared with the known individual or select low controls, as taught in the German Reference DE-OS 27 40 419, the deceleration signal (−b) and possibly the slip signal (λ) of the low wheel, reacts not simultaneously with brake pressure reduction, but only when the brake pressure is being held constant.

Although a number of embodiments of the anti-lock brake system, according to the present invention, have been described in detail above, it should be apparent to those persons skilled in the vehicle braking art that various other modifications and adaptations of this invention may be made without departing from the spirit and scope of the attached claims.

We claim:

1. A vehicle anti-lock brake system, said anti-lock brake system comprising:
   (a) a solenoid control valve connectable at a fluid pressure inlet port to enable communication of fluid pressure thereto from a source of such fluid pressure, said solenoid control valve being connectable at a fluid pressure outlet port to a predetermined pair of brake cylinders positioned on such vehicle, said solenoid control valve controls communication of such fluid pressure to such predetermined pair of brake cylinders and evacuation of such fluid pressure from such predetermined pair of brake cylinders;

(b) a speed sensing means positionable on such vehicle adjacent each brakeable wheel for each of determining a rotational speed of such brakeable wheel and for generating an electrical signal having a value representative of such rotational speed and for transmitting said electrical signal;

(c) an electronic control system positionable on such vehicle and electrically connectable at an input terminal thereof to each said speed sensing means to enable receiving said electrical signal value generated by said speed sensing means, said electronic control system being electrically connectable at an output terminal thereof to enable transmission of an electrical control signal to an input terminal of said solenoid control valve;

(d) a means disposed in said electronic control system for determining when said electrical signal value received by said electronic control system from each said speed sensing means is representative of a deceleration signal value of a low wheel, said electronic control system in response to said electrical signal value being representative of said deceleration signal value transmits a pressure hold electrical control signal to said input terminal of said solenoid control valve;

(e) a means disposed in said electronic control system for determining when said electrical signal value received by said electronic control system from each said speed sensing means is representative of a slip signal value of a low wheel, said electronic control system in response to said electrical signal value being representative of said slip signal value transmits a pressure decrease electrical control signal to said input terminal of said solenoid control valve;

(f) a means disposed in said electronic control system for determining when said electrical signal value received by said electronic control system from each said speed sensing means is representative of a decrease in said electrical signal value of said slip signal value of such low wheel, said electronic control system in response to said decrease in said electrical signal value representative of said slip signal value of such low wheel transmits a pressure increase electrical control signal to said input terminal of said solenoid control valve;

(g) a switch means disposed in said electronic control system for switching to a select low control mode; and (h) a timer means disposed in said electronic control system for determining a time duration of an electrical signal value being received by said electronic control system from each said speed sensing means and wherein said switching means in said electronic control system will switch to said select low control mode when said speed sensing means adjacent each of a high wheel and a low wheel transmits an electrical signal value representative of a slip signal value to said input terminal of said electronic control system for a duration of about 100 ms as determined by said timer means.

2. An anti-lock brake system, according to claim 1, wherein said electronic control system further includes a means disposed therein for determining when said electrical signal value received by said electronic control system from each said speed sensing means indicates at least one of a deceleration signal value and a slip signal value from a high wheel, said electronic control system in response to this determination transmits an appropriate electrical control signal to said input terminal of said solenoid control valve to switch said solenoid control valve to a pressure decrease position.

3. An anti-lock brake system, according to claim 2, wherein said switch means in said electronic control system switches to a select low control mode when said speed sensing means adjacent a high wheel transmits an electrical signal value representative of a slip signal value to said input terminal of said electronic control system.

4. An anti-lock brake system, according to claim 2, wherein said electronic control system further includes a second switching means disposed therein for switching to a select low control mode during a first control cycle of said anti-lock brake system.

5. An anti-lock brake system, according to claim 2, wherein said electronic control system further includes a switching means disposed therein for switching said anti-lock brake system to a select low control mode at a vehicle speed determined by said speed sensing means to be less than about 15 km/hr.

6. An anti-lock brake system, according to claim 1, wherein said switch means in said electronic control system switches to a select low control mode when said speed sensing means adjacent a high wheel transmits an electrical signal value representative of a slip signal value to said input terminal of said electronic control system.

7. An anti-lock brake system, according to claim 6, wherein said electronic control system further includes a second switching means disposed therein for switching to said select low control mode during a first control cycle of said anti-lock brake system.

8. An anti-lock brake system, according to claim 6, wherein said electronic control system further includes a second switching means disposed therein for switching said anti-lock brake system to said select low control mode at a vehicle speed determined by said speed sensing means to be less than about 15 km/hr.

9. An anti-lock brake system, according to claim 1, wherein said electronic control system further includes a second switching means disposed therein for switching to a select low control mode during a first control cycle of said anti-lock brake system.

10. An anti-lock brake system, according to claim 9, wherein said electronic control system further includes a second switching means disposed therein for switching said anti-lock brake system to said select low control mode at a vehicle speed determined by said speed sensing means to be less than about 15 km/hr.

11. An anti-lock brake system, according to claim 1, wherein said electronic control system further includes a switching means disposed therein for switching said anti-lock brake system to a select low control mode at a vehicle speed determined by said speed sensing means to be less than about 15 km/hr.

12. An electronic control apparatus for a vehicle anti-lock brake system, said electronic control apparatus comprising:

(a) a solenoid actuated control valve having a fluid pressure inlet port and a fluid pressure outlet port, said inlet port being connectable to receive fluid pressure from a source of such fluid pressure, said outlet port being connectable to a predetermined pair of brake cylinders positioned on such vehicle, said solenoid actuated control valve controlling both communication of such fluid pressure to such predetermined pair of brake cylinders and for evacuating such fluid pressure from such predetermined pair of brake cylinders;

(b) a speed sensing means positionable on such vehicle in a position adjacent each brakeable wheel for each of determining a rotational speed of an associated brakeable wheel and for generating an electrical signal having a value representative of such rotational speed of such associated brakeable wheel and for transmitting said electrical signal value;

(c) an electronic control system positionable on such vehicle, said electronic control system having at least one input terminal and at least one output terminal, said electronic control system being electrically connectable at said input terminal thereof to each of said speed sensing means to enable receiving said electrical signal value thereat, said electronic control system being electrically connectable at said output terminal thereof to an input terminal of said solenoid actuated control valve to enable transmission of an electrical control signal thereto;

(d) a first means disposed in said electronic control system for determining when said electrical signal value being received by said electronic control system from said each of said speed sensing means is representative of a deceleration signal value of a low wheel, said electronic control system transmitting a pressure hold electrical control signal to said input terminal of said solenoid actuated control valve in response to said electrical signal value being representative of said deceleration signal value of such low wheel;

(e) a second means disposed in said electronic control system for determining when said electrical signal value being received by said electronic control system from said each of said speed sensing means is representative of a slip signal value of such low wheel, said electronic control system transmitting a pressure increase electrical control signal to said input terminal of said solenoid actuated control valve in response to said electrical signal value being representative of said slip signal value of such low wheel;

(f) a third means disposed in said electronic control system for determining when said electrical signal value being received by said electronic control system from said each of said speed sensing means is representative of a decrease in said electrical signal value of said slip signal value of such low wheel, said electronic control system transmitting a pressure increase electrical control signal to said input terminal of said solenoid actuated control valve in response to said decrease in said electrical signal value representative of said slip signal value of such low wheel;

(g) a fourth means disposed in said electronic control system for determining when said electrical signal value being received by said electronic control system from said each of said speed sensing means is representative of at least one of a deceleration signal value and a slip signal value of a high wheel, said electronic control system transmitting a pressure decrease electrical control signal to said input terminal of said solenoid control valve in response to said electrical signal value of such high wheel being representative of said at least one of said deceleration signal value and said slip signal value;

(h) a timer means disposed in said electronic control system for determining a time duration of said electrical signal value being received by said electrical control system from said each of said speed sensing means; and (i) a microprocessor disposed in said electronic control system for generating appropriate electrical control signals to be transmitted to said input terminal of said solenoid actuated control valve.

13. An electronic control apparatus for an anti-lock brake system, according to claim 12, wherein said microprocessor includes a program means loaded therein to switch said anti-lock brake system to a select low control mode when said speed sensing means positioned adjacent a high wheel transmits an electrical signal value representative of a slip signal value to said electronic control system.

14. An electronic control apparatus for an anti-lock brake system, according to claim 13, wherein said program means loaded in said microprocessor switches said anti-lock brake system to said select low control mode when said speed sensing means positioned adjacent each of such high wheel and such low wheel transmits an electrical signal value representative of a slip signal value to said electronic control system for a duration of about 100 ms as determined by said timer means.

15. An electronic control apparatus for an anti-lock brake system, according to claim 14, wherein said program means loaded in said microprocessor switches said anti-lock brake system into said select low control mode during a first control cycle of said anti-lock brake system.

16. An electronic control apparatus for an anti-lock brake system, according to claim 15, wherein said program means loaded in said microprocessor switches said anti-lock brake system into said select low control mode at a vehicle speed determined by said speed sensing means to be less than about 15 km/hr.

17. A control method for a fluid pressure responsive anti-lock brake system positioned on a vehicle, said control method comprising the steps of:

(a) connecting an electrically actuated and electrically controllable solenoid control valve at a fluid pressure medium inlet port thereof to a source of said fluid pressure medium positioned on such vehicle;

(b) connecting a fluid pressure medium outlet port of said electrically actuated and controllable solenoid control valve to a predetermined pair of brake cylinders positioned on such vehicle;

(c) initiating a brake application on such vehicle;

(d) activating said electrically actuated and controllable solenoid control valve substantially at an identical time as said brake application initiated in step (c) by feeding an electrical control signal to an input terminal of said electrically actuated and controllable solenoid control valve from an output terminal of an electronic control system positioned on such vehicle;

(e) communicating said fluid pressure medium to said inlet port of said electrically actuated and controllable solenoid control valve from said source of said fluid pressure medium substantially at an identical time as said electrical control signal is fed to said input terminal of said electrically actuated and controllable solenoid control valve in step (d);

(f) communicating a first predetermined volume of said fluid pressure medium from said outlet port of said electrically actuated and controllable solenoid control valve to each of said predetermined pair of brake cylinders substantially at an identical time as said fluid pressure medium is communicated to said inlet port of said electrically actuated and controllable solenoid control valve in step (e) thereby applying a first predetermined brake pressure on each of a respective brakeable wheel mounted on such vehicle;

(g) determining a rotational speed of each said brakeable wheel with a speed sensing means positioned on such vehicle adjacent a respective one of each said brakeable wheel;

(h) generating an electrical signal value representative of said rotational speed of said each said brakeable wheel determined in step (g);

(i) feeding said electrical signal value generated in step (h) from an output terminal of said speed sensing means to an input terminal of said electronic control system;

(j) determining in said electronic control system when said electrical signal value being fed to said input terminal thereof in step (i) is an electrical signal value representative of a deceleration signal value of a low wheel;

(k) generating a brake pressure hold electrical control signal in said electronic control system in response to a determination in step (j) of said electrical signal value fed to said input terminal of said electronic control system in step (i) being representative of said deceleration signal value of said low wheel;

(l) feeding said brake pressure hold electrical control signal generated in step (k) from said output terminal of said electronic control system to said input terminal of said electrically actuated and controllable solenoid control valve;

(m) maintaining said first predetermined brake pressure on said each of said respective brakeable wheel applied in step (f) in response to said brake pressure hold electrical control signal fed to said input terminal of said electrically actuated and controllable solenoid control valve in step (1);

(n) determining in said electronic control system when said electrical signal value fed to said input terminal thereof in step (i) is an electrical signal value representative of a slip signal value of said low wheel;

(o) generating a brake pressure decrease electrical control signal in said electronic control system in response to a determination in step (n) of said electrical signal value being fed to said input terminal of said electronic control system in step (i) being representative of said slip signal value of said low wheel;

(p) feeding said brake pressure decrease electrical control signal generated in step (o) from said output terminal of said electronic control system to said input terminal of said electrically actuated and controllable solenoid control valve;

(q) evacuating from said predetermined pair of brake cylinders a predetermined portion of said first predetermined volume of said fluid pressure medium communicated thereto in step (f) thereby decreasing said first predetermined brake pressure being applied in step (f);

(r) determining in said electronic control system when said electrical signal value fed to said input terminal thereof in step (i) is an electrical signal value representative of a decrease in said slip signal value of said low wheel determined in step (n);

(s) generating a brake pressure increase electrical control signal in said electronic control system in response to a determination in step (r) of said electrical signal value fed to said input terminal of said electronic control system in step (i) being representative of said decrease in said slip signal value of said low wheel;

(t) feeding said brake pressure increase electrical control signal generated in step (s) from said output terminal of said electronic control system to said input terminal of said electrically actuated and controllable solenoid control valve;

(u) communicating a second predetermined volume of said fluid pressure medium from said outlet port of said electrically actuated and controllable solenoid control valve to said each of said predetermined pair of brake cylinders thereby applying a second predetermined brake pressure on said each of said respective brakeable wheel;

(v) terminating said brake application initiated in step (c); and (w) evacuating substantially all of said fluid pressure medium from said each of said predetermined pair of brake cylinders in response to an electrical control signal being fed from said output terminal of said electronic control system to said input terminal of said electrically actuated and controllable solenoid control valve after said brake application has been terminated in step (v).

18. A control method for a fluid pressure responsive anti-lock brake system, according to claim 17, wherein after step (i) and prior to step (v) said control method includes the additional steps of:

(a') determining in said electronic control system when said electrical signal value being fed to said input terminal thereof in step (i) is an electrical signal value representative of at least one of a deceleration signal value and a slip signal value of a high wheel;

(b') generating a brake pressure decrease electrical control signal in said electronic control system in response to a determination in step (a') of said electrical signal value fed to said input terminal of said electronic control system in step (i) being representative of said at least one of said deceleration signal value and said slip signal value of said high wheel;

(c') feeding said brake pressure decrease electrical control signal generated in step (b') from said output terminal of said electronic control system to said input terminal of said electrically actuated and controllable solenoid control valve; and (d') evacuating from said predetermined pair of brake cylinders a predetermined portion of said first predetermined volume of said fluid pressure medium communicated thereto in step (f) thereby decreasing said first predetermined brake pressure being applied in step (f) to said high wheel.

19. A control method for a fluid pressure responsive anti-lock brake system, according to claim 18, wherein after step (i) and prior to step (v) said control method includes the additional steps of:

(a'') determining in said electronic control system when said electrical signal value being fed to said input terminal thereof in step (i) is said electrical signal value representative of said slip signal value of said high wheel;

(b'') generating a select low control mode electrical control signal in said electronic control system in response to a determination in step (a'') of said electrical signal value fed to said input terminal of said electronic control system in step (i) being representative of said slip signal value of said high wheel;

(c'') feeding said select low control mode electrical control signal generated in step (b'') from said output terminal of said electronic control system to said anti-lock brake system; and (d'') switching said anti-lock brake system to said select low control mode.

20. A control method for a fluid pressure responsive anti-lock brake system, according to claim 19, wherein during step (i) said control method includes the additional step of determining a time duration in said electronic control system of said electrical signal value being fed to said input terminal thereof being which is representative of said slip signal value of each of said high wheel and said low wheel.

21. A control method for a fluid pressure responsive anti-lock brake system, according to claim 20, wherein said control method includes the additional steps of:

(aa) generating a select low control mode electrical control signal in said electronic control system in response to a determination of said time duration being about 100 ms;

(bb) feeding said select low control mode electrical control signal generated in step (aa) from said output terminal of said electronic control system to said anti-lock brake system; and (cc) switching said anti-lock brake system to said select low control mode.

22. A control method for a fluid pressure responsive anti-lock brake system, according to claim 21, wherein said control method includes the additional step of switching said anti-lock brake system into said select low control mode during a first control cycle of said anti-lock brake system.

23. A control method for a fluid pressure responsive anti-lock brake system, according to claim 22, wherein said control method includes the additional step of switching said anti-lock brake system into said select low control mode at a vehicle speed determined in said electronic control system of less than about 15 km/hr.

* * * * *